United States Patent Office 3,706,727
Patented Dec. 19, 1972

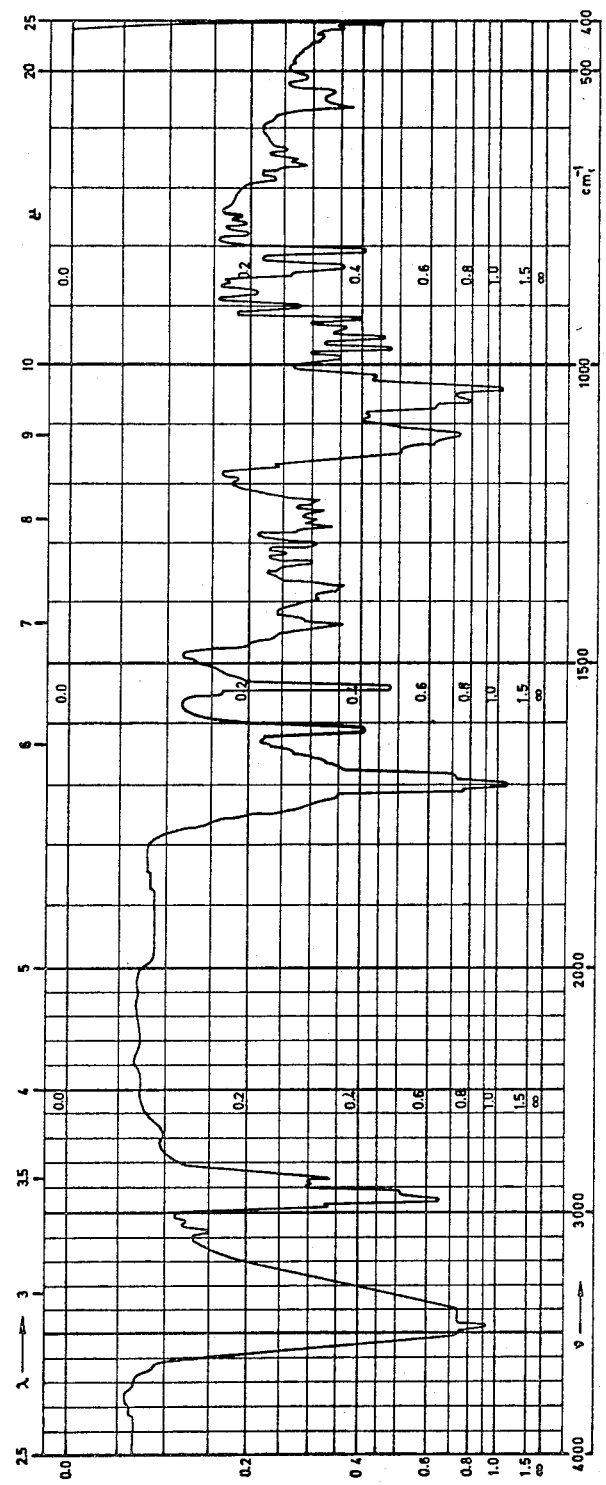

3,706,727
STEROID COMPOUNDS EFFECTIVE AGAINST CARDIAC CONDITIONS AND METHOD OF THEIR PREPARATION

Wilhelmine Beran, Linz, Austria, assignor to Laevosan-Gesellschaft Chem. Pharm. Industrie, Franck & Dr. Freudl, Linz, Austria
Filed June 10, 1969, Ser. No. 831,847
Claims priority, application Austria, June 10, 1968, A 5,546/68
Int. Cl. C07c 173/00
U.S. Cl. 260—210.5           22 Claims

ABSTRACT OF THE DISCLOSURE

The present invention provides novel steroid compounds having the formula

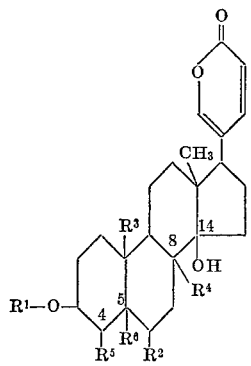

wherein $R_1$ is hydrogen or a sugar radical; $R_2$ is hydrogen, a hydroxyl group or an ester or an ether thereof with a lower alkyl carboxylic acid or a lower alkyl alcohol; $R_3$ is a lower alkyl radical which may be substituted with an oxygen atom, a hydroxyl group, a lower alkoxy group, or with the acyl radical of a lower alkyl carboxylic acid; $R_4$ is hydrogen, the hydroxyl group or an ester thereof with a lower alkyl carboxylic acid, or is the ethoxy group; and $R_5$ and $R_6$ are each a hydroxyl group or together form an epoxy group.

BACKGROUND OF THE INVENTION

It has been known for a long time that various naturally occurring steroids in the form of their glycoside affect the activity of the heart. These compounds are known as "cardiac glycoside." They consist of a steroid skeleton which is bonded in the No. 3 position with one or more sugar radicals. Commonly these glycosides, per se, are used in medicine. They can be separated into the sugar radical and a pure steroid. The latter is referred to as an aglycone. Generally the aglycones also have biological activity. It is also possible to separate an aglycone from the naturally occurring glycoside and then combine it with one or more different surgars to produce glycosides which do not occur in nature.

Among the known cardiac glycosides, a number of the natural glycosides have an epoxy group on the steroid skeleton in the 14, 15 position. The aglycones of these cardiac glycosides have the formula

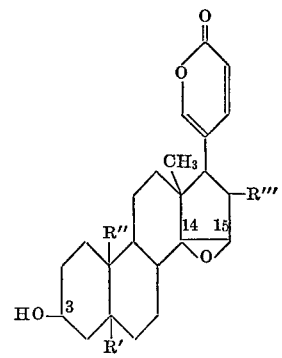

The aforedescribed aglycones and the noted R groups are illustrated in the following table:

| Aglycone | R' | R'' | R''' |
|---|---|---|---|
| Resibufogenin | H | $CH_3$ | H |
| Marinobufagenin | OH | $CH_3$ | H |
| Bufotalin | OH | CHO | H |
| Desacetylcinobufagin | H | $CH_3$ | OH |
| Cinobufagin | H | $CH_3$ | OAc |
| Cinobufotalin | OH | $CH_3$ | OAc |
| Desacetylcinobufotalin | OH | $CH_3$ | OH |

The compounds and their glycosides have not been used in cardiac therapy. The present invention has as the primary object the preparation of useful novel steroids.

SUMMARY OF THE INVENTION

Novel cardiac glycosides having the structural formula depicted hereinbefore in the "Abstract of the Disclosure" where $R_1$ is hydrogen or a sugar radical such as the radical of a monosaccharides such as glucose or rhamnose, of a disaccharide such as glucorhamnose, or of a trisaccharide or of a sugar derivative such as the esters of organic acids or ethers or condensation products with carbonyl compounds; $R_2$ is hydrogen, a hydroxyl group, an ester formed by the reaction of the hydroxyl group with an organic acid, or an ether formed by the reaction of the hydroxyl group with an alcohol; $R_3$ is an alkyl radical which may have substituted thereon oxygen atoms, hydroxyl groups, alkoxy groups, or acyl radicals; and $R_4$ is hydrogen or a hydroxyl group which may have been etherified by reaction with an alcohol or esterified by reaction with an organic acid. These compounds are prepared by oxidizing the corresponding triolefin steroid [A. V. Wartburg, M. Kulm; Helv. Chim. Acta 51/6

(1968); and Helv. Chim. Acta 47 (1964)] having the formula

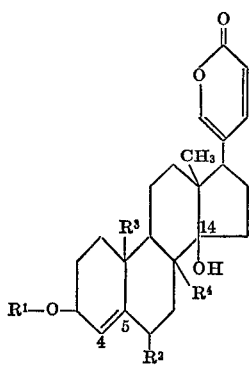

BRIEF DESCRIPTION OF THE DRAWING

The drawing is the infra red spectrum of the product of Example 1.

DETAILED DESCRIPTION OF THE INVENTION

The preferred steroid compounds are those in which $R_1$ is hydrogen or a sugar radical; $R_2$ is hydrogen, a hydroxyl group, or an —$OR_7$ group wherein $R_7$ is the acyl radical of a saturated organic acid containing 1–3 carbon atoms (and preferably acetic acid) or the residue of an alcohol containing 1–3 carbon atoms; $R_3$ is a methyl radical or a methyl radical substituted with an oxygen atom, a hydroxyl group, an alkoxy group containing 1–2 carbon atoms, or an acyl radical of a saturated organic acid containing 1–3 carbon atoms; $R_4$ is hydrogen, a hydroxyl group, or a —$OR_8$ group where $R_8$ is the acyl radical of a saturated organic acid containing 1–3 carbon atoms or is the ethyl group; and $R_5$ and $R_6$ are each a hydroxyl group or together form an epoxy group.

The preferred sugar radicals are the saccharides and particularly the monosaccharides such as 3-$\beta$-rhamnoside, the disaccharides such as 3-$\beta$-glucorhamnoside, and the trisaccharides such as 3-$\beta$-diglucorhamnosido. The steroid compounds in which $R_1$ is hydrogen, i.e., the aglycones, are also preferred.

Other specifically preferred sugar radicals include rhamnose (Rh), glucose (Gluc) and the following:

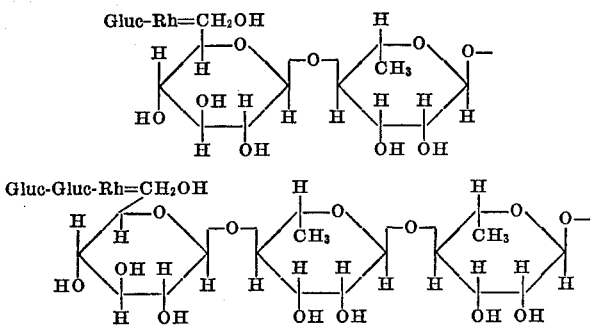

Isopropylidenrhamnose:

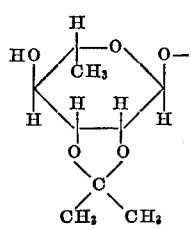

Cyclohexyldenrhamnose:

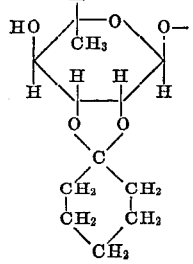

O-methylpropylidenrhamnose:

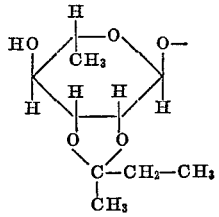

The triolefin steroid reactant is oxidized to the desired diolefinic steroid product. This may be accomplished utilizing peracid oxidation, or molecular oxygen oxidation. The peracid oxidation preferably utilizes organic peracids such as perbenzoic acid and monoperphthalic acid. The oxidation is preferably carried out in an organic solvent such as the chlorinated hydrocarbons and alcohols.

Oxidation with molecular oxygen is normally a cataytic reaction. Such catalysts as the naphthanates of cobalt, manganese, lead, iron and vanadium, as well as sodium vanadate and sodium tungstate, may be used. The oxidation may be carried out over a wide temperature range, e.g., between about 20° and 110° C. It is preferred to carry out the reaction in a boiling solvent such as chloroform, dioxane, or similar materials.

An illustrative process for the preparation of the diolefinic epoxide or the corresponding dihydroxy substituted products follows.

3$\beta$-rhamnosido-14$\beta$ - hydroxy-$\Delta^{4,20,22}$-bufatrienolide is dissolved in chloroform-methanol and treated with an ether solution of perbenzoic acid and then allowed to stand overnight at room temperature. The epoxide product precipitates overnight in relatively pure crystalline form. It is removed by suction filtration, washed with ether and recrystallized from methanol-water.

The epoxide product can also be obtained using ethereal monoperphthalic acid solution under more vigorous conditions.

The best yields are obtained using a six molar excess of monoperphthalic acid or perbenzoic acid. The six member doubly unsaturated lactone ring remains intact as can be noted from the ultraviolet spectrum (absorption maximum at 300 mm. in methanol). The novel products also exhibit the color reactions characteristic for bufadienolides, namely, the Liebermann and Keller-Killiani reactions.

The invention is further illustrated in the following examples. The reactants and products are tabularized for convenience following the examples.

EXAMPLE 1

1 gram of 3$\beta$-rhamnosido-14$\beta$-hydroxy-$\Delta^{4,20,22}$-bufatrienolide (about 1.87 mM.) is dissolved in 12 ml. of chloroform and 2 ml. of methanol and 60 ml. of an ethereal solution of perbenzoic acid (0.19 mM. perbenzoic acid per ml.) are added. After thorough shaking, it is set aside overnight at room temperature. The next day, the crystals of epoxide which have precipitated are removed by suction filtration, washed with ether and dried. Yield: 0.9 g. crude product (=87% of theoretical yield). The crude epoxide is dissolved in hot methanol and water is added until a slight opalescence is obtained. After suction filtration and drying over phosphorus pentoxide, there is obtained 0.8 g. of very pure glycoside (=78% of the theoretical yield) with a melting range of 235 to 240° C. with yellowing. Ultraviolet absorption maximum: 300 m$\mu$ in methanol; specific rotation [$\alpha$]$_D^{20°}$=—45° C. (c.=2.0 in methanol). Elementary analysis: C, 63.44%, H, 7.86%. The IR spectrum is depicted in the drawing. The IR spectrum was obtained under the following conditions:

Concentration _____ 1 mg./300 KBr  
Phase _____ $\delta$  
Slit program _____ 4  
Gain _____ 2  
Pen traverse time _____ 3  
Response _____ 1  
Scanning speed _____ 4/S  
Suppression _____ 0

Upon the addition of ethereal perbenzoic acid solution to the mother liquor, no epoxide should precipitate upon standing overnight. The perbenzoic acid is prepared in accordance with the literature (A. Kergomard, J. Philibert Bigou, Bull. Soc. Chim. Franc. 1958/334, see also Organicum, page 404, 6th edition, DVW.) from benzoylchloride and hydrogen peroxide. It is advisable to use perbenzoic acid solution which has been prepared as recently as possible since the perbonzoic acid content decreases in the course of time. The perbenzoic acid content should be determined before use (see Organic Reactions, volume VII/3, page 380).

EXAMPLE 2

50 mg. 3$\beta$-glucorhamnosido-14$\beta$-hydroxy-$\Delta^{4,20,22}$-bufatrienolide are dissolved in 4 ml. of chloroform and 1 ml. of methanol, and 4 ml. of ethereal perbenzoic acid (0.19 mM./ml.) added, whereupon it is left overnight at room temperature and then concentrated to dryness in vacuum. The residue is extracted in ether, suction filtered and recrystallized from a small amount of methanol/water. Melting range: 245–250° C., with yellowing.

EXAMPLE 3

50 mg. 3$\beta$-diglucorhamnoside-14$\beta$-hydroxy-$\Delta^{4,20,22}$-bufatrienolide are dissolved in 4 ml. of chloroform and 1 ml. of methanol, and then 4 ml. of an ethereal perbenzoic acid solution (0.19 mM./ml.) are added and it is set aside overnight at room temperature. The next day it is concentrated in vacuum and the residue is extracted in a small amount of ether, suction filtered and recrystallized from a small amount of methanol/water. Melting range: 235–240° C., with yellowing.

EXAMPLE 4

The novel cardiac glycosides obtained in accordance with Examples 1 to 3 are identical with regard to mixed melting point and thin-film chromatographic behavior with preparations which are obtained by reacting the corresponding cardiac glycosides with an ethereal solution of monoperphthalic acid. Monoperphthalic acid was obtained in accordance with the literature (L. F. Fieser and M. Fieser, Steroids, 1961, page 215). The moroperhpthalic acid content should be determined in the same manner as in the case of perbonzoic acid.

EXAMPLE 5

50 mg. aglycon (for R$_1$=hydrogen, R$_2$=hydrogen, R$_3$=CHO, R$_4$=hydrogen, double bond between C$_4$ and C$_5$), are dissolved in 10 ml. chloroform and 2 ml. methanol and treated with 6 ml. of an ethereal perbonzoic acid solution (0.23 mM./ml.) and set aside overnight at room temperature. The next day, concentration in vacuum is effected, the residue is extracted in a small amount of ether, suction filtered and recrystallized from a small amount of methanol/water. Melting range: 247–252° C. with decomposition.

EXAMPLE 6

1 g. of 3$\beta$-rhamnoside - 14$\beta$ - hydroxy-$\Delta^{4,20,22}$-bufatrienolide (about 1.87 mM.) is dissolved in 12 ml. of chloroform at the boiling point under reflux; about 2 mg. of Co-II-naphthanate and 20 mg. MgO are added and the mixture is maintained under reflux at the boiling point. A slow stream of oxygen is introduced for 3 to 4 hours through a glass frit into the boiling suspension. Filtration is then effected while still hot and the next day the epoxide crystals which have precipitated are removed by suction filtration and purified further as in Example 1. Yield 0.6 g. epoxy glycoside (=59% of the theoretical yield).

EXAMPLE 7

5 g. 3$\beta$-(2',3'-O-isopropylidene)-$\alpha$-L-rhamnoside-14$\beta$-hydroxy-19-oxo-bufa-4,20,22-trienolid are dissolved in 100 ml. chlorofrom and 10 ml. methanol and mixed with 3 mol quantity of peracetic acid in glacial or crystalline acetic (produced in accordance with Houben-Weyl, Sauerstoffverbingungen III, page 41) at room temperature and left standing for five hours, and then evaporating (in vacuum) the solvent and the superfluous peracetic acid. The residue is recrystallized out of the methanol-water to obtain 4.5 g. 3$\beta$-(2',3'-O-isopropylidene)-$\alpha$-L-rhamnosido-14$\beta$ - hydroxy - 19 - oxo - 4,5 - epoxy-bufa-20,22-dienolide (87%). Melting range 155–160° C. with decomposition.

EXAMPLE 8

2 g. 3$\beta$-2',3'-O-(isopropylidene)-$\alpha$-L-rhamnosido-14$\beta$-hydroxy-bufa-4,20,22-trienolide were stirred in 50 ml. chloroform and 5 ml. methanol with 3 mol excess of peracetic acid in crystallized acetic acid, at room temperature for 3 hours. The starting product goes into solution. One evaporates in vacuum and crystallizes the residue from ethanol-water to obtain 1.6 g. 3$\beta$-2',3'-O-(isopropylidene)-$\alpha$-L-rhamnoside-14$\beta$-hydroxy - 4,5 - epoxy-bufa-20,22-dienolide (77%). Melting range 199–207° C. with decomposition.

EXAMPLE 9

1 g. 3$\beta$-$\alpha$-L-rhamnosido-14,19-dihydroxy-bufa-4,20,22-trienolide in 20 ml. chloroform and 5 ml. methanol jointly with 3 mol of peracetic acid in crystallized acetic acid is stirred for five hours at room temperature. The solution is then dried in vacuum and the residue is recrystallized from methanol to obtain 0.7 g. 3$\beta$-$\alpha$-L-rhamnoside-14,19-dihydroxy-4,5-epoxy-bufa - 20,22 - dienolide (68%). Melting range 170–175° C.

EXAMPLE 10

1 g. 3$\beta$-D-glucoside-14-hydroxy-bufa-4,20,22-trienolide were dissolved in 30 ml. chloroform and 5 ml. methanol and mixed with a 3 molar peracetic acid, and left at room temperature for one day. One evaporates in vacuum to obtain after recrystallization from methanol 0.8 g. (78%) 3$\beta$-D-glucoside - 14 - hydroxy - 4,5 - epoxy-bufa-20,22-dienolide. Melting range 220–225° C. with decomposition.

EXAMPLE 11

1 g. 3$\beta$-D-glucosido-8,14-dihydroxy - 6 - acetoxy-bufa-4,20,22-trienolide are stirred with a 3 molar quantity of peracetic acid at room temperature for five hours, evaporated in vacuum and the residue recrystallized from methanol-water to obtain 0.6 g. (59%) 3$\beta$-D-glucoside-8,14-dihydroxy - 6 - acetoxy-4,5-epoxy-bufa-4,20,22-trienolide. Melting range 185–191° C. with decomposition.

EXAMPLE 12

2 g. 3$\beta$-(2',3'-O-cyclohexylidene)-$\alpha$-L-rhamnoside-14$\beta$-hydroxy-bufa-4,20,22-trienolide are dissolved in 50 ml. chloroform and 5 ml. methanol and mixed with 3 mol of peracetic acid in crystallized acetic acid and left at room temperature for five hours. The solution is then evaporated in vacuum and the residue recrystallized from the methanol-water to obtain 1.5 g. 3β-(2',3'-O-cyclohexylidene)-α-L-rhamnoside - 14β - hydroxy-4,5-epoxy-bufa-20,22-dienolide. Melting range 149–155° C. with decomposition.

EXAMPLE 13

2 g. 3β-(2,3'-O-methyl-propylidene)-α-L-rhamnosido-14β-hydroxy-bufa-4,20,22-trienolide are admixed as in Example 12 to obtain 1.7 g. (81%) 3β-(2',3'-O-methylpropylidene)-α-L-rhamnosido-14β-hydroxy - 4,5 - epoxy-20,22-bufadienolide. Melting range 225–231° C.

The dihydroxy products corresponding to the specified epoxy products are similarly prepared. They have similar properties and utility.

The reactants and products are tabularized for convenience in the following table.

bon atoms; $R_3$ is a methyl radical, or (i) a carbonyl group, (ii) a hydroxyl group, (iii) an alkoxy group containing 1–2 carbon atoms, or (iv) an acyloxy radical of a saturated organic acid containing 1–3 carbon atoms; $R_4$ is hydrogen, a hydroxyl group, an ethoxy group, or a $-OR_8$ group wherein $R_8$ is the acyl radical of a saturated organic acid containing 1–3 carbon atoms; and $R_5$ and $R_6$ toegther form an epoxy group.

2. The steroid compound of claim 1 wherein said $R_1$ is a member selected from the group consisting of one of said mono-, di-, or tri- saccharides as defined in claim 1.

3. The steroid compound of claim 1 wherein $R_1$ is hydrogen or a mono-, di-, or tri-saccharide as defined in claim 1, $R_2$ is hydrogen, acetoxy or ethoxy, $R_3$ is methyl, and $R_4$ is hydrogen.

| Reactant | Product | $R^1$ | $R^2$ | $R^3$ | $R^4$ | Ex. |
|---|---|---|---|---|---|---|
| 3β-rhamnosido-14β-hydroxy-bufa-4,20,22-trienolide. | 3β-rhamnosido-14β-hydroxy-4,5-epoxy-bufa-20,22-dienolide. | Rh | H | $CH_3$ | H | 1 |
| 3β-glucorhamnosido-14β-hydroxy-bufa- 4,20,22-trienolide. | 3β-glucorhamnosido-14β-hydroxy-4,5-epoxy-bufa-20,22-dienolide. | Gluc-Rh | H | $CH_3$ | H | 2 |
| 3β-diglucorhamnosido-14β-hydroxy-bufa-4,20,22-trienolide. | 3β-diglucorhamnosido-14β-hydroxy-4,5-epoxy-bufa-20,22-dienolide. | Gluc-gluc-Rh | H | $CH_3$ | H | 3 |
| 3,14-dihydroxy-19-oxo-bufa-4,20,22-dienolide. | 3,14-dihydroxy-19-oxo-4,5-epoxy-bufa-20,22-dienolide. | H | H | CHO | H | 5 |
| 3β-(2',3'-O-isopropylidene)-rhamnosido-14β-hydroxy-19-oxo-bufa-4,20,22-trienolide. | 3β-(2',3'-O-isopropylidene)-rhamnosido-14β-hydroxy-19-oxo-4,5-epoxy-bufa-20,22-dienolide. | Isopropylidene-Rh | H | CHO | H | 7 |
| 3β-(2',3'-O-isopropylidene)-rhamnosido-14β-hydroxy-bufa-4,20,22-trienolide. | 3β-(2',3'-O-isopropylidene)-rhamnosido-14β-hydroxy-4,5-epoxy-bufa-20,22-dienolide. | do | H | $CH_3$ | H | 8 |
| 3β-rhamnosido-14,19-dihydroxy-bufa-4,20,22-trienolide. | 3β-rhamnosido-14,19-dihydroxy-4,5-epoxy-bufa-20,22-dienolide. | Rh | H | $CH_2OH$ | H | 9 |
| 3β-D-glucosido-14-hydroxy-bufa-4,20,22-trienolide. | 3β-D-glucosido-14-hydroxy-4,5-epoxy-bufa-20,22-dienolide. | Gluc | H | $CH_3$ | H | 10 |
| 3β-D-glucosido-8,14-dihydroxy-6-acetoxy-bufa-4,20,22-trienolide. | 3β-D-glucosido-8,14-dihydroxy-6-acetoxy-4,5-epoxy-bufa-20,22-dienolide. | Gluc | $OCOCH_3$ | $CH_3$ | OH | 11 |
| 3β-(2',3'-O-cyclohexylidene)-rhamnosido-14β-hydroxy-bufa-4,20,22-trienolide. | 3β-(2',3'-O-cyclohexylidene)-rhamnosido-14β-hydroxy-4,5-epoxy-bufa-20,22-dienolide. | Cyclohexylidene-Rh | H | $CH_3$ | H | 12 |
| 3β-(2',3'-O-methylpropylidene)-rhamnosido-14β-hydroxy-bufa-4,20,22-trienolide. | 3β(2',3'-O-methylpropylidene)-rhamnosido-14β-hydroxy-4,5-epoxy-bufa-20,22-dienolide. | Methylpropylidene-Rh | H | $CH_3$ | H | 13 |

The novel products of the present invention are useful as heart glycosides generally. They are specifically utilized for normalization of pathological symptoms. They overcome the symptom of tachycardy and act to support the functioning of the heart and increase the oxygen supply to the heart. Accordingly, they are advantageous in connection with tachycardiac occurrences due to the age. They are also advantageous in overcoming conditions of nervous excitement. The mean effective dosage for human beings is about 1.5 mg. per day for adults. The compounds may be administered orally, parenterally, and rectally.

I claim:
1. A steroid having the formula

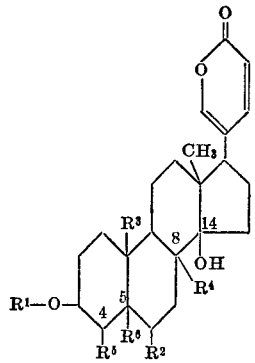

wherein $R_1$ is hydrogen or the radical of a monosaccharide selected from the group consisting of glucoses and rhamnoses, a disaccharide selected from glucorhamnopyranoses or a trisaccharide selected from among diglucorhamnopyranoses in the form of an ester of an organic acid having 1 to 8 carbon atoms or of an ether having 1 to 8 carbon atoms or of a condensation product with carbonyl compounds having 1 to 8 carbon atoms; $R_2$ is hydrogen, a hydroxyl group, or a $-OR_7$ group wherein $R_7$ is the acyl radical of a saturated organic acid containing 1–3 carbon atoms or is the residue of an alcohol containing 1–3 car- 4. The steroid compound of claim 2 wherein $R_1$ is a member selected from the group consisting of one of said mono-, di-, or tri-saccharides defined in claim 1, $R_2$ is hydrogen, acetoxy or ethoxy, $R_3$ is methyl, and $R_4$ is hydrogen.

5. The process for preparing the steroid compounds of claim 1 comprising oxidizing steroid compounds having the formula

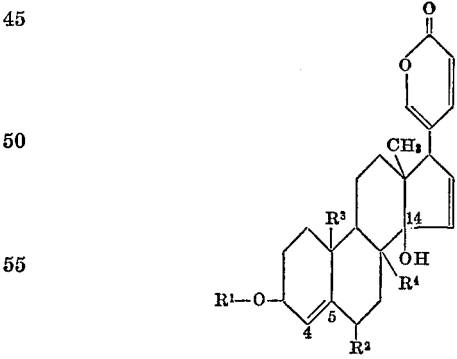

wherein $R_1$ is hydrogen or the radical of a monosaccharide selected from the group consisting of glucoses and rhamnoses, a disaccharide selected from glucorhamnopyranoses or a trisaccharide selected from diglucorhamnopyranoses in the form of an ester of an organic acid having 1 to 8 carbon atoms or of an ether having 1 to 8 carbon atoms or of a condensation product with carbonyl compounds having 1 to 8 carbon atoms; $R_2$ is hydrogen, a hydroxyl group or an ester or an ether thereof with a lower alkyl carboxylic acid or a lower alkyl alcohol; $R_3$ is a lower alkyl radical which may be substituted with (i) an oxygen atom, (ii) a hydroxyl group, (iii) a lower alkoxy group, or (iv) with the acyloxy radical of a lower alkyl carboxylic acid; $R_4$ is hydrogen, the hydroxyl group or an ester thereof with a lower alkyl carboxylic acid, or is an ethoxy group; at the 4,5 position with an oxidizing agent selected from the group consisting of (i) peracids and (ii) molecular oxygen in the presence of a catalyst selected from the group consisting of a naphthanate of cobalt, manganese, lead, iron, and vanadium, sodium vaadate, and sodium tungstate, whereby said olefinic bond between the 4 and 5 positions is oxidized to an epoxy group bridging said positions.

6. The process of claim 5 wherein said oxidation utilizes an organic peracid selected from the group consisting of perbenzoic acid and monoperphthalic acid.

7. The process of claim 6 wherein said oxidation reaction is carried out in an organic solvent selected from the group consisting of chlorinated hydrocarbons and alcohols.

8. The process of claim 6 wherein said organic peracid is dissolved in an ether solution and then added to a solution of the reactant steroid.

9. The process of claim 8 wherein said oxidation is carried out at about 20° C.

10. The process of claim 5 wherein said oxidation is carried out utilizing molecular oxygen at a temperature between about room temperature and 110° C.

11. The process of claim 10 wherein said oxidation is carried out in a boiling solvent selected from the group consisting of chloroform and dioxane.

12. The steroid compound of claim 1 3$\beta$-rhamnosido-14$\beta$ - hydroxy - 4,5 - epoxy-bufa-20,22-dienolide.

13. The steroid compound of claim 1 3$\beta$ - glucorhamnosido - 14$\beta$ - hydroxy - 4,5-epoxy-bufa-20,22-dienolide.

14. The steroid compound of claim 1 3$\beta$-diglucorhamnosido - 14$\beta$ - hydroxy - 4,5 - epoxy-bufa-20,22-dienolide.

15. The steroid compound of claim 1 3,14-dihydroxy-19-oxo-4,5-epoxy-bufa-20,2-dienolide.

16. The steroid compound of claim 1 3$\beta$-(2',3',-O-isopropylidene)-rhamnosido - 14$\beta$ - hydroxy - 19 - oxo-4,5-epoxy-bufa-20,22-dienolide.

17. The steroid compound of claim 1 3$\beta$-(2',3'-O-isopropylidene)-rhamnosido - 14$\beta$ - hydroxy-4,5-epoxy-bufa-20,22-dienolide.

18. The steroid compound of claim 1 3$\beta$-rhamnosido-14,19 - dihydroxy - 4,5 - epoxy-bufa-20,22-dienolide.

19. The steroid compound of claim 1 3$\beta$-D-glucosido-14 - hydroxy - 4,5 - epoxy-bufa-20,22-dienolide.

20. The steroid compound of claim 1 3$\beta$-D-glucoside-8,14 - dihydroxy - 6 - acetoxy - 4,5 - epoxy-bufa-20,22-dienolide.

21. The steroid compound of claim 1 3$\beta$-(2',3'-O-cyclohexylidene)-rhamnosido - 14$\beta$ - hydroxy - 4,5-epoxy-bufa-20,22-dienolide.

22. The steroid compound of claim 1 3$\beta$-(2',3'-O-methylpropylidene)-rhamnosido - 14$\beta$ - hydroxy - 4,5-epoxy-bufa-20,22-dienolide.

References Cited
UNITED STATES PATENTS

| | | | |
|---|---|---|---|
| 3,359,261 | 12/1967 | Anner et al. | 260—239.55 |
| 3,366,651 | 1/1968 | Lefebvre | 260—239.55 |
| 3,407,194 | 10/1968 | Strike et al. | 260—239.55 |
| 3,468,875 | 9/1969 | Loken et al. | 260—239.55 |
| 3,472,836 | 10/1969 | Vogelsang et al. | 260—210.5 R |

LEWIS GOTTS, Primary Examiner

J. R. BROWN, Assistant Examiner

U.S. Cl. X.R.

260—239.57; 424—182